US012645772B2

(12) United States Patent
Im et al.

(10) Patent No.: US 12,645,772 B2
(45) Date of Patent: Jun. 2, 2026

(54) METHOD, COMPUTER DEVICE, AND NON-TRANSITORY COMPUTER-READABLE RECORDING MEDIUM TO MANAGE CONTENT FOR USER ACCOUNT

(71) Applicant: LINE Plus Corporation, Seongnam-si (KR)

(72) Inventors: Jihun Im, Seongnam-si (KR); Min Hwang, Seongnam-si (KR); Sangmo Goo, Seongnam-si (KR); Yubin Kim, Seongnam-si (KR); Jay Lee, Seongnam-si (KR); Yeon Jin Jin, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 377 days.

(21) Appl. No.: 17/572,717

(22) Filed: Jan. 11, 2022

(65) Prior Publication Data

US 2022/0222327 A1     Jul. 14, 2022

(30) Foreign Application Priority Data

Jan. 13, 2021     (KR) ......................... 10-2021-0004380

(51) Int. Cl.
*G06F 21/31*          (2013.01)
*G06F 11/34*          (2006.01)
(Continued)

(52) U.S. Cl.
CPC ........ *G06F 21/316* (2013.01); *G06F 11/3438* (2013.01); *G06Q 10/40* (2026.01);
(Continued)

(58) Field of Classification Search
CPC ... G06F 21/316; G06F 11/3438; G06Q 50/01; G06Q 50/10; G06Q 50/40; H04L 47/80; H04L 51/21; H04L 67/535; H04L 51/04
See application file for complete search history.

(56) References Cited

U.S. PATENT DOCUMENTS 8,892,672 B1 *   11/2014   Rackliffe ................ H04L 51/52
                                                                    709/206
9,992,278 B2 *   6/2018   Chen ................... H04L 67/1095
                         (Continued)

FOREIGN PATENT DOCUMENTS

KR      10-2014-0058618 A      5/2014
KR      10-2016-0139039 A      12/2016
                         (Continued)

OTHER PUBLICATIONS

Korean Office Action dated Feb. 21, 2025 issued in Korean Patent Application No. 10-2021-0004380 with English translation.

*Primary Examiner* — Ramy M Osman
(74) *Attorney, Agent, or Firm* — Harness, Dickey & Pierce, P.L.C.

(57)          ABSTRACT

Disclosed is a method, computer device, and non-transitory computer-readable record medium for managing content of a user account. A content management method including analyzing a use pattern for each account for a plurality of accounts used by a user, determining whether a user activity using a first account among the plurality of accounts corresponds to a use pattern of the first account, and providing a notification for the user activity when the user activity does not correspond to the use pattern of the first account may be provided.

18 Claims, 9 Drawing Sheets

(51) Int. Cl.

| | |
|---|---|
| *G06Q 10/40* | (2026.01) |
| *H04L 47/80* | (2022.01) |
| *H04L 51/04* | (2022.01) |
| *H04L 51/21* | (2022.01) |
| *H04L 51/48* | (2022.01) |
| *H04L 67/30* | (2022.01) |
| *H04L 67/50* | (2022.01) |

(52) U.S. Cl.
CPC ............. *H04L 47/80* (2013.01); *H04L 51/04* (2013.01); *H04L 51/21* (2022.05); *H04L 51/48* (2022.05); *H04L 67/30* (2013.01); *H04L 67/535* (2022.05)

(56) References Cited

U.S. PATENT DOCUMENTS

| | | | | |
|---|---|---|---|---|
| 10,291,568 | B2 * | 5/2019 | Goslar | ................. H04L 51/212 |
| 10,447,639 | B2 * | 10/2019 | Ali | ........................... H04L 67/06 |
| 10,735,593 | B1 * | 8/2020 | Dinsing | ............... H04L 51/046 |
| 11,088,982 | B1 * | 8/2021 | Agarwal | ................. H04L 51/48 |
| 2006/0200834 | A1 * | 9/2006 | Cukierman | ........... G06F 9/4451 |
| | | | | 719/328 |
| 2007/0088793 | A1 * | 4/2007 | Landsman | ............ H04L 51/212 |
| | | | | 709/224 |
| 2007/0105531 | A1 * | 5/2007 | Schroeder | ......... H04M 3/42229 |
| | | | | 455/433 |
| 2007/0244977 | A1 * | 10/2007 | Atkins | ................. H04L 51/063 |
| | | | | 709/206 |
| 2007/0294428 | A1 * | 12/2007 | Guy | .................... G06Q 10/107 |
| | | | | 709/245 |
| 2009/0106383 | A1 * | 4/2009 | Liang | ...................... H04L 51/48 |
| | | | | 709/206 |
| 2009/0119758 | A1 * | 5/2009 | Tsuchiya | ................. H04L 51/48 |
| | | | | 709/206 |
| 2010/0179995 | A1 * | 7/2010 | Wang | .................. G06Q 10/107 |
| | | | | 709/206 |
| 2012/0223951 | A1 * | 9/2012 | Dunn | ...................... H04L 51/52 |
| | | | | 345/467 |
| 2012/0233661 | A1 * | 9/2012 | Myers | ................. G06Q 10/107 |
| | | | | 726/4 |
| 2014/0325016 | A1 * | 10/2014 | Chen | ...................... H04L 67/52 |
| | | | | 709/217 |
| 2016/0085698 | A1 * | 3/2016 | Mikkola | .............. G06F 13/128 |
| | | | | 710/8 |
| 2016/0205052 | A1 * | 7/2016 | DeLuca | ............... H04L 51/212 |
| | | | | 709/206 |
| 2017/0063755 | A1 * | 3/2017 | Pulfer | ................... H04L 63/104 |
| 2017/0068904 | A1 * | 3/2017 | Korycki | .................. H04L 51/04 |
| 2017/0279759 | A1 * | 9/2017 | Liden | ................... H04L 65/1069 |
| 2018/0343563 | A1 * | 11/2018 | Adilipour | ............ H04L 67/306 |
| 2019/0068804 | A1 * | 2/2019 | Ichikawa | .......... H04N 1/00209 |
| 2019/0197479 | A1 * | 6/2019 | Huang | .................... H04W 4/14 |
| 2020/0036831 | A1 * | 1/2020 | Kim | .................... H04L 67/306 |
| 2020/0151620 | A1 * | 5/2020 | Chao | .................. H04L 51/212 |
| 2022/0222327 | A1 * | 7/2022 | Im | ........................ G06F 21/316 |
| 2022/0329556 | A1 * | 10/2022 | Daga | ...................... H04L 51/23 |
| 2022/0407835 | A1 * | 12/2022 | Zean | ...................... H04L 51/18 |

FOREIGN PATENT DOCUMENTS

| | | |
|---|---|---|
| KR | 10-1762615 B1 | 7/2017 |
| KR | 101754373 B1 | 7/2017 |
| KR | 10-2019-0130913 A | 11/2019 |

* cited by examiner

Provide additional information based on use pattern of corresponding
account in response to user access using single account among
plurality of accounts                    — S540

End

METHOD, COMPUTER DEVICE, AND NON-TRANSITORY COMPUTER-READABLE RECORDING MEDIUM TO MANAGE CONTENT FOR USER ACCOUNT

CROSS-REFERENCE TO RELATED APPLICATION(S)

This U.S. non-provisional application and claims the benefit of priority under 35 U.S.C. § 119 to Korean Patent Application No. 10-2021-0004380, filed Jan. 13, 2021, the entire contents of which are incorporated herein by reference in their entirety.

BACKGROUND

Technical Field

Some example embodiments relate to technology for managing content of a user account.

Related Art

A community service, such as a social network service (SNS) and a messenger, supports interaction through posts by forming a relationship between users.

The community service may provide different contextual information to a user. For example, the community service may provide update information, post update information, and various other types of information items about a connection relationship of a user.

Some of community services provide a view form that allows reading of posts in a timeline type. A timeline type post displaying method is generally used for a private communication in which content update and consumption is rapidly performed.

SUMMARY

Some example embodiments may manage content of each account based on a use pattern for each account for a user having a plurality of accounts.

Some example embodiments may determine an account suitable for a current user activity based on a use pattern for each account.

Some example embodiments may provide content suitable for a corresponding account based on a use pattern of a user for each account.

According to an aspect of at least one example embodiment, a content management method performed by a computer device including at least one processor configured to execute computer-readable instructions included in a memory may include, by the at least one processor, analyzing a use pattern for each account for a plurality of accounts used by a user, determining whether a user activity using a first account among the plurality of accounts corresponds to a use pattern of the first account, and providing a notification for the user activity when the user activity does not correspond to the use pattern of the first account.

The providing may include providing the notification that includes information about an account currently in use.

The providing may include providing the notification that includes information about a second account having a use pattern that corresponds to the user activity among the plurality of accounts.

The providing may include providing the notification that includes an interface for converting the first account to a second account having a use pattern that corresponds to the user activity among the plurality of accounts.

The providing may include providing the notification that includes an interface for opening a new account when all of use patterns of the plurality of accounts do not correspond to the user activity.

The analyzing may include analyzing the use pattern of a corresponding account based on content consumed by the user for each account.

The analyzing may include analyzing the use pattern of a corresponding account based on content uploaded by the user for each account.

The analyzing may include analyzing the use pattern of a corresponding account based on a message sent from the user for each account.

The analyzing may include analyzing the use pattern of a corresponding account based on a social graph related to the user for each account.

The determining may include comparing the user activity to the use pattern of each account and verifying an account having a use pattern that corresponds to the user activity among the plurality of accounts.

The determining may include determining whether the user activity using the first account corresponds to a use pattern of the first account based on a tag of content specified as the user activity, a result of analyzing the content specified as the user activity, or a visit destination or a message destination specified as the user activity.

According to an aspect of at least one example embodiment, there is provided a non-transitory computer-readable record medium storing an instruction that, when executed by at least one processor included in a computer device, causes the computer device to perform the content management method.

According to an aspect of at least one example embodiment, there may be provided a computer device including at least one processor configured to execute computer-readable instructions included in a memory. The at least one processor may be configured to cause the computer device to analyze a use pattern for each account for a plurality of accounts used by s same user, and a provide a notification for a user activity depending on whether the user activity using a first account among the plurality of accounts corresponds to a use pattern of the first account.

Further areas of applicability will become apparent from the description provided herein. The description and specific examples in this disclosure are intended for purposes of illustration only and are not intended to limit the scope of the present disclosure.

BRIEF DESCRIPTION OF DRAWINGS

FIG. 3 is a diagram illustrating an example of a component includable in a processor of a computer device according to at least one example embodiment;

FIGS. 6 to 9 illustrate examples of an account management notification based on a use pattern according to at least one example embodiment.

DETAILED DESCRIPTION

Figure 1:
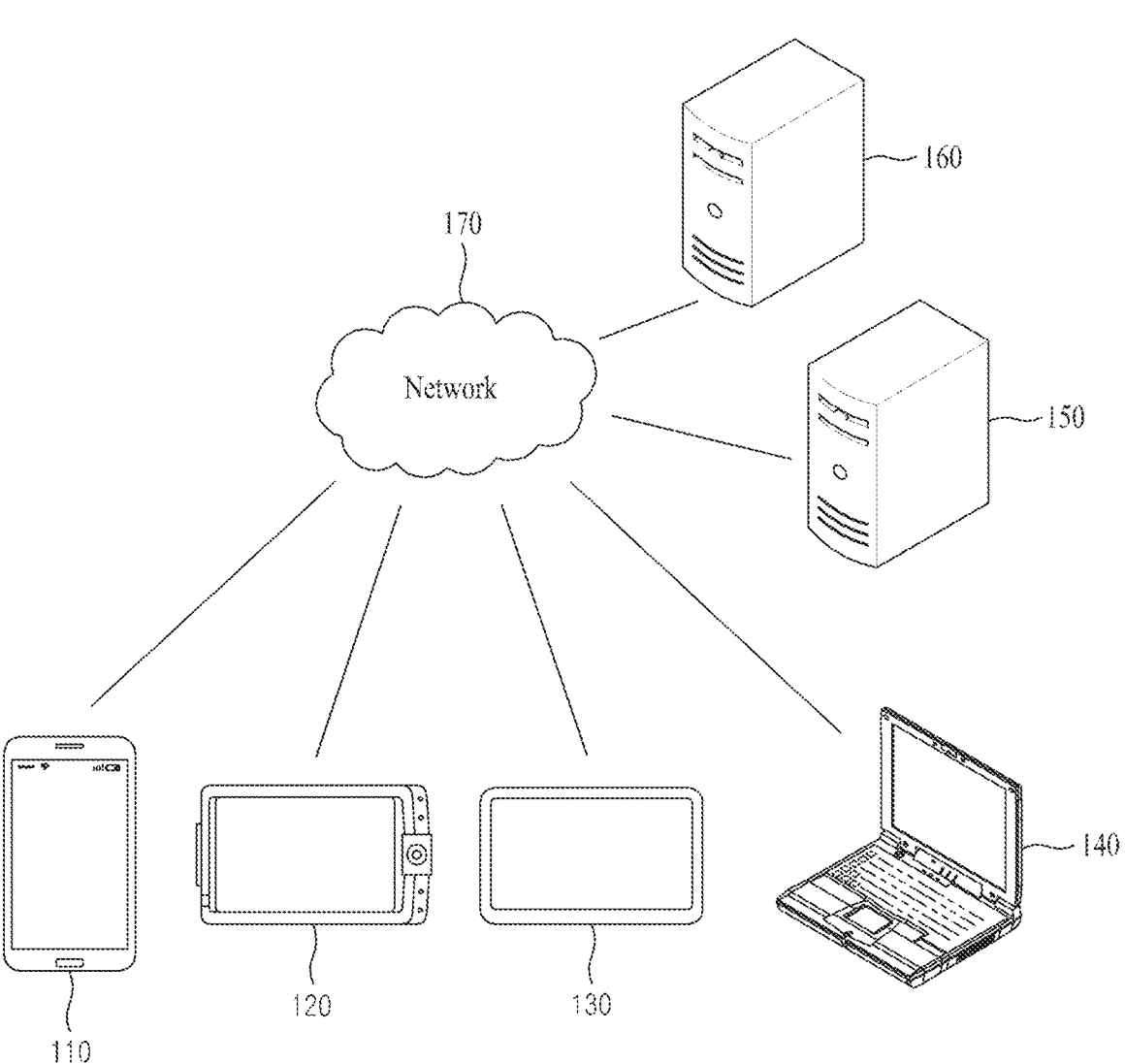
FIG. 1 is a diagram illustrating an example of a network environment according to at least one example embodiment.

One or more example embodiments will be described in detail with reference to the accompanying drawings. Example embodiments, however, may be embodied in various forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

The example embodiments relate to technology for managing content of a user account.

The example embodiments including the disclosures herein may manage content of each account based on a use pattern for each account for a user having a plurality of accounts, and, through this, may achieve many advantages in terms of content management efficiency, convenience, quality of service (QoS), and the like.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer device capable of communicating with other electronic devices 120, 130, and 140, and/or the servers 150 and 160 over the network 170 in a wireless or wired communication manner. The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. Also, the server 160 may be a system that provides a second service to the plurality of electronic devices 110, 120, 130, and 140 connected over the network 170. For example, through an application as a computer program that is installed and running on the plurality of electronic devices 110, 120, 130, and 140, the server 150 may provide a service, for example, a community service, desired by the corresponding application to the plurality of electronic devices 110, 120, 130, and 140, as the first service. As another example, the server 160 may provide a service that distributes a file for installing and running the application to the plurality of electronic devices 110, 120, 130, and 140, as the second service.

Figure 2:
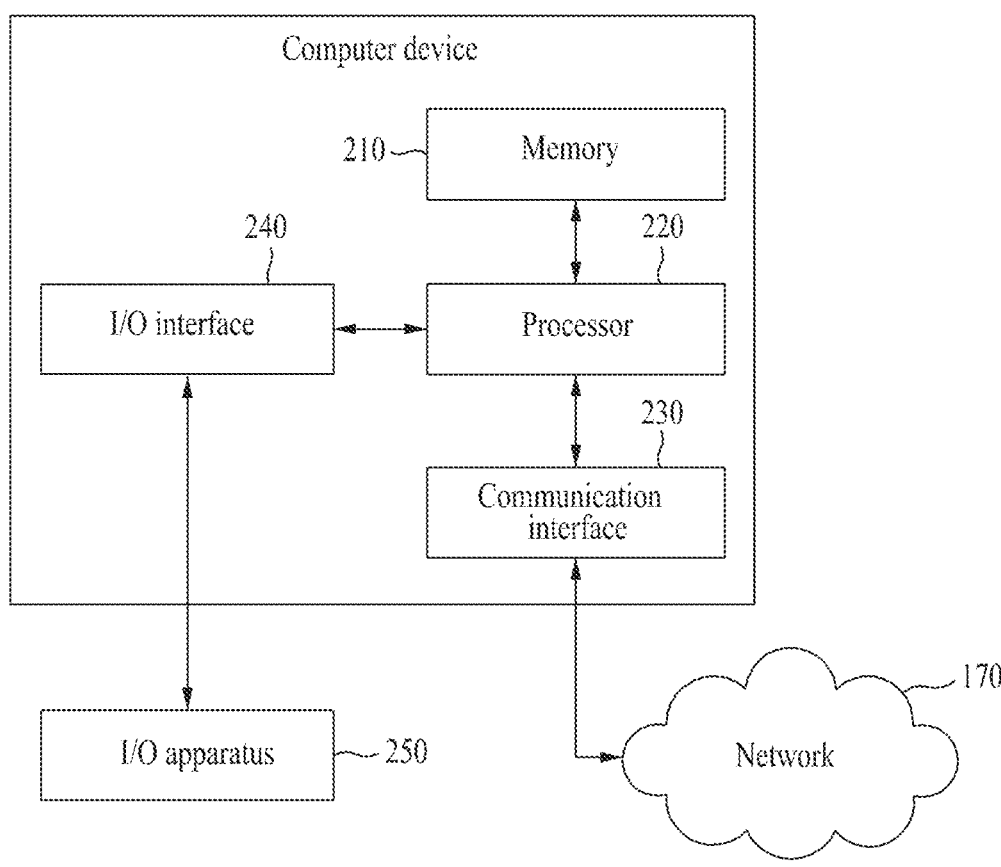
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210. In some example embodiments, the processor 220 may include the communication interface 230 and the I/O interface 240.

The communication interface 230 may provide a function for communication between the communication apparatus 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. The I/O apparatus 250 may be configured as a single apparatus with the computer device 200.

According to other example embodiments, the computer device 200 may include a number of components greater than or less than a number of components shown in FIG. 2. However, there is no need to clearly illustrate many components according to the related art. For example, the computer device 200 may include at least a portion of the I/O apparatus 250, or may further include other components, for example, a transceiver, a database (DB).

Hereinafter, a method and system for managing content of a user account according to some example embodiments are described.

The example embodiments relate to technology for managing content of a user account in a community.

The term "community" used herein may encompass a communication space on the Internet, such as a messenger and a social network service (SNS). For example, the community may include a chatroom that allows a chat through a friend addition process using a telephone number or an ID between individuals, and may also include an open-chat that allows an immediate chat through a link, such as a uniform resource locator (URL), without the friend addition process, an official account that represents an account in a form of a bot providing a variety of services or contents, and the like. It is provided as an example only. The community may be expansively applied to any spaces that allow persons having a common matter of interest or environment to communicate through various communication functions such as a chat, a post, a comment, and the like.

Figure 3:
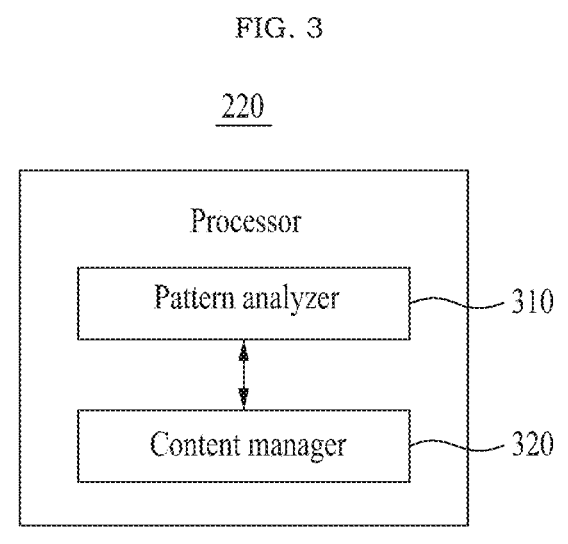
Figure 4:
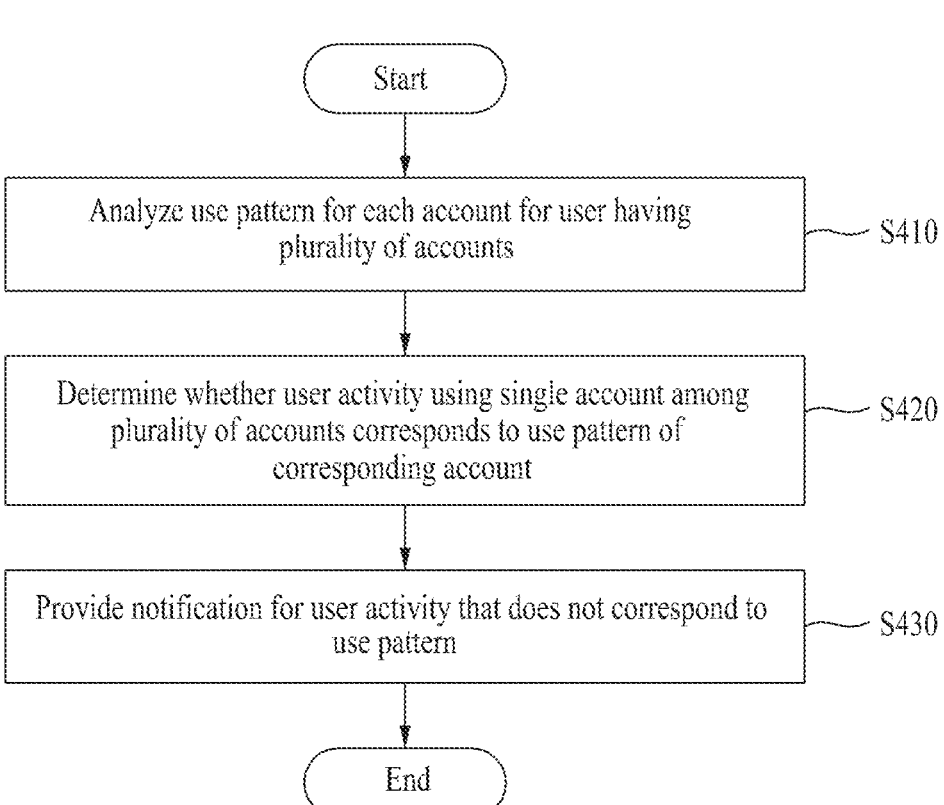
FIG. 4 is a flowchart illustrating an example of a content management method performed by a computer device according to at least one example embodiment.

FIG. 3 is a diagram illustrating an example of a component included in a processor of a computer device according to at least one example embodiment, and FIG. 4 is a flowchart illustrating an example of a method performed by a computer device according to at least one example embodiment.

A computer-implemented content management system may be configured in the computer device 200. For example, the content management system may be implemented in a form of a program that independently operates or may be configured in an in-app form of a specific application to run on the specific application.

The content management system implemented in the computer device 200 may perform the content management method of FIG. 4 in response to an instruction provided by an application installed on the computer device 200.

Referring to FIG. 3, to perform the content management method of FIG. 4, the processor 220 of the computer device 200 may include a pattern analyzer 310 and a content manager 320. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer device 200 to perform operations 5410 to 5430 included in the content management method of FIG. 4. For example, the processor 220 and the components of the processor 220 may be configured to execute an instruction according to a code of at least one program and a code of an OS included in the memory 210.

Here, the components of the processor 220 may be representations of different functions of the processor 220 performed by the processor 220 in response to an instruction provided from the program code stored in the computer device 200, for example, an instruction provided from the application that runs on the computer device 200. For example, the pattern analyzer 310 may be used as a functional representation of the processor 220 that controls the computer device 200 to analyze a use pattern of a corresponding account in response to the aforementioned instruction.

The processor 220 may read a instruction from the memory 210 to which instructions associated with control of the computer device 200 are loaded. In this case, the read instruction may include an instruction for controlling the processor 220 to perform the following operations 5410 to 5430.

Referring to FIG. 4, in operation 5410, the pattern analyzer 310 may analyze a use pattern for each account for a user having a plurality of accounts. Here, the plurality of accounts refers to personal accounts used by the same user in the same service. A community user may create and use at least two accounts according to the purpose of use. That is, the processor 220 may create a plurality of accounts for the same user as an ID through which the corresponding user is accessible to the community service in response to a user request.

The pattern analyzer 310 may analyze a use pattern based on a user activity performed in a corresponding account for each account used by the same user. For example, the pattern analyzer 310 may analyze a content consumption pattern of the user based on content consumed by the user in a corresponding account for each account. The pattern analyzer 310 may analyze a content consumption pattern using a search term used by the user for content search, a common feature or a common point of places visited by the user, that is, visit destinations in a community, and the like. The common feature or the common point of the visited places may include tag information of content included in a corresponding visited place, and a result of analyzing the content, and the like. As another example, the pattern analyzer 310 may analyze a content upload pattern of the user based on content uploaded by the user in a corresponding account for each account. The pattern analyzer 310 may analyze the content upload pattern using a hash tag of content uploaded by the user, a result of analyzing the content, and the like. Through content analysis technology using artificial intelligence (AI) and machine learning, the pattern analyzer 310 may analyze a pattern of content consumed or uploaded by the user. As another example, the pattern analyzer 310 may analyze a chat pattern of the user based on a message sent from the user in a corresponding account for each account. The pattern analyzer 310 may analyze a chat pattern using contents or a type of a text, an image (a photo or a video), a voice, a file, and a sticker sent from the user as a message. As another example, the pattern analyzer 310 may analyze a relationship pattern of the user based on a social graph where a corresponding account for each account is included therein. The pattern analyzer 310 may analyze a relationship pattern using tag information or category information of another account having a relationship established with an account of the user.

Therefore, the pattern analyzer 310 may analyze a use pattern that includes a content consumption pattern, a content upload pattern, a chat pattern, and a relationship pattern of the corresponding user for each account used by the same user.

In operation 5420, the content manager 320 may determine whether a current user activity using a single account among the plurality of accounts used by the same user corresponds to a use pattern of a corresponding account. Here, the user activity may encompass all activities that include a user input in the community. The content manager 320 may compare the user activity to a use pattern of each account and may verify an account having a use pattern that corresponds to the user activity.

The content manager 320 may determine a use pattern of an account that corresponds to various types of user activities related to content in the community, for example, a content input such as upload, a content disclosure scope, a reaction such as a rating and a comment, and a message destination. For example, the content manager 320 may determine whether a corresponding user activity corresponds to a use pattern of a current account or another account based on a tag of content specified as the user activity. As another example, when content specified as the user activity and the user desires to upload is an image (e.g., a photo and a video), the content manager 320 may determine whether the corresponding user activity corresponds to the use pattern of the current account or the other account based on an image analysis result. As another example, the content manager 320 may determine whether the user activity corresponds to the use pattern of the current account or the other account based on a destination the user desires to visit or a destination to which the user desires to send a message in the community.

In operation 5430, when a user activity that does not correspond to a use pattern of the current account is detected in the current account as a determination result of operation 5420, the content manager 320 may provide a notification for the user activity. The content manager 320 may provide a message notification for an active activity such as content upload, rating, and comment input, depending on whether the activity corresponds to the use pattern of the current account.

For example, when a user activity that does not correspond to the use pattern of the current account is detected, the content manager 320 may provide a notification indicating an account currently in use. As another example, when the user activity that does not correspond to the use pattern of the current account is detected, the content manager 320 may provide a guide notification indicating another account having a use pattern that corresponds to the corresponding user activity instead of the account currently in use. Here, the guide notification may include an interface for receiving an input on whether to continue the user activity by switching to the other account of the use pattern that corresponds to the user activity.

For a passive activity of simply viewing or reading content in the community, it is possible to display content for each account through a single common view as information about account integration.

Therefore, the example embodiments may provide a notification to a user using a plurality of accounts in response to detecting a user activity deviating from a use pattern of an account being used by the user in the corresponding account.

Depending on example embodiments, optimized additional information may be provided for each account based on a use pattern for each account used by the same user.

Figure 5:
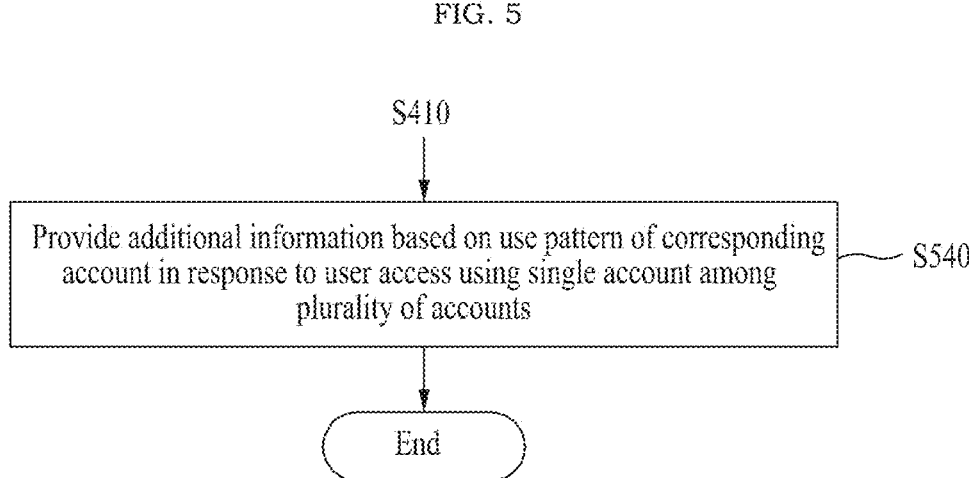
FIG. 5 is a flowchart illustrating another example of a content management method according to at least one example embodiment.

Referring to FIG. 5, in operation 5540, the content manager 320 may provide additional information based on a use pattern of a corresponding account in response to a user access using a single account among the plurality of accounts used by the same user.

For example, the content manager 320 may recommend another user or a visit destination in the community as additional information that corresponds to a use pattern of an account accessed by the user among the plurality of accounts. As another example, the content manager 320 may recommend additional content, for example, an advertisement and a post, as additional information that corresponds to the use pattern of the account accessed by the user among the plurality of accounts.

Therefore, the content manager 320 may additionally provide customized information according to a use pattern of a corresponding account for each account used by the user.

FIGS. 6 to 9 illustrate examples of an account management notification based on a use pattern according to at least one example embodiment.

Hereinafter, a post may encompass various types of posts, for example, a text, a photo, a video, and a sticker, provided in a community space on the Internet, such as an SNS, a messenger, and a blog. Currently, the community provides a timeline service that sorts and displays posts over time.

It is assumed that the user creates two accounts, for example, a "family" account and a "friend" account in the community according to the purpose. In FIGS. 6 to 9, it is assumed that the user is connected to a service screen through the "family" account.

Figure 6:
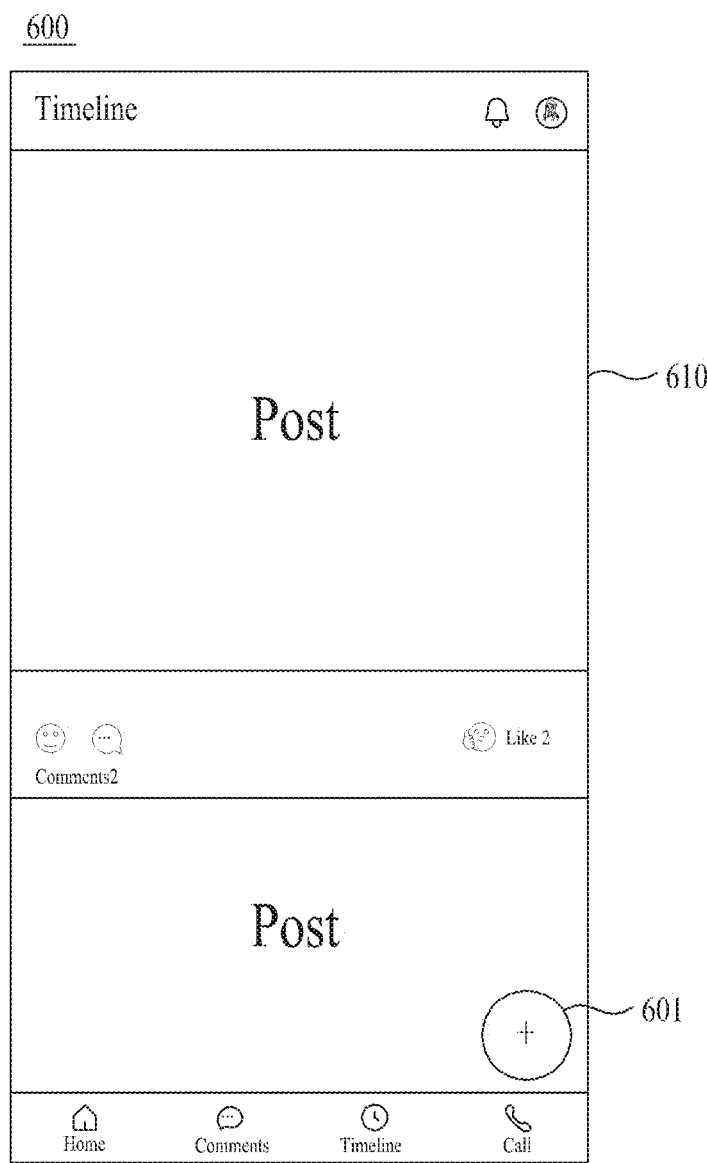

FIG. 6 illustrates an example of a timeline service screen 600.

Referring to FIG. 6, the processor 220 may sort and display timeline posts 610 received from the server 150 in chronological order on the timeline service screen 600.

A comment registration interface capable of attaching various types of comments, such as, a text, a photo, a video, and a sticker, may be included for each of the posts 610 included in the timeline service screen 600.

A post writing interface 601 for writing a new post may be included in the timeline service screen 600.

Figure 7:
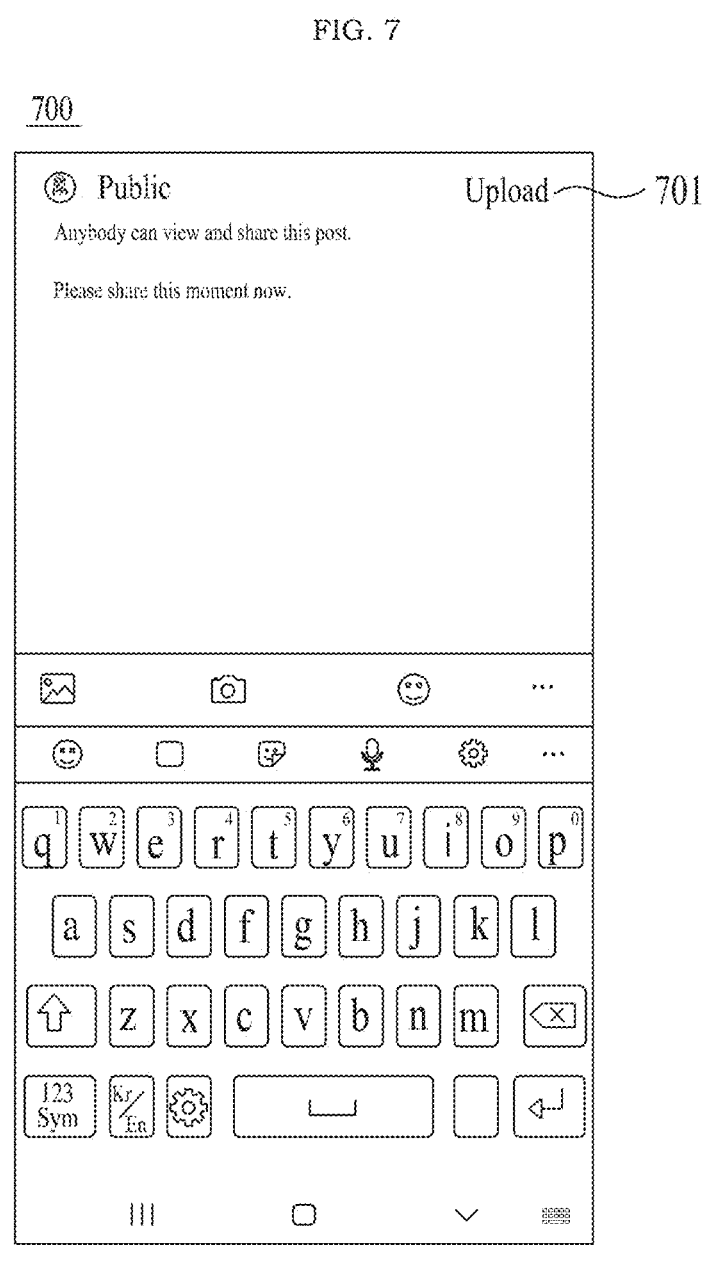

Referring to FIG. 7, when the user selects the post writing interface 601 on the timeline service screen 600, the processor 220 may provide a post writing screen 700.

The post writing screen 700 refers to an input screen for creating a document to be published in the community and includes an interface for inputting various types of contents, for example, a text, a photo, a video, and a sticker.

Here, the post writing screen 700 may include a post registration interface 701 for registering the written post.

When the post registration interface 701 is input on the post writing screen 700, the processor 220 may determine whether the post written through the post writing screen 700 is content that corresponds to a use pattern of the "family" account.

For example, when the user mainly using the "family" account as an account to upload baby photos writes a post with a news link through the post writing screen 700 and requests a post registration, the post may be regarded as content that does not correspond to the use pattern of the "family" account.

Figure 8:
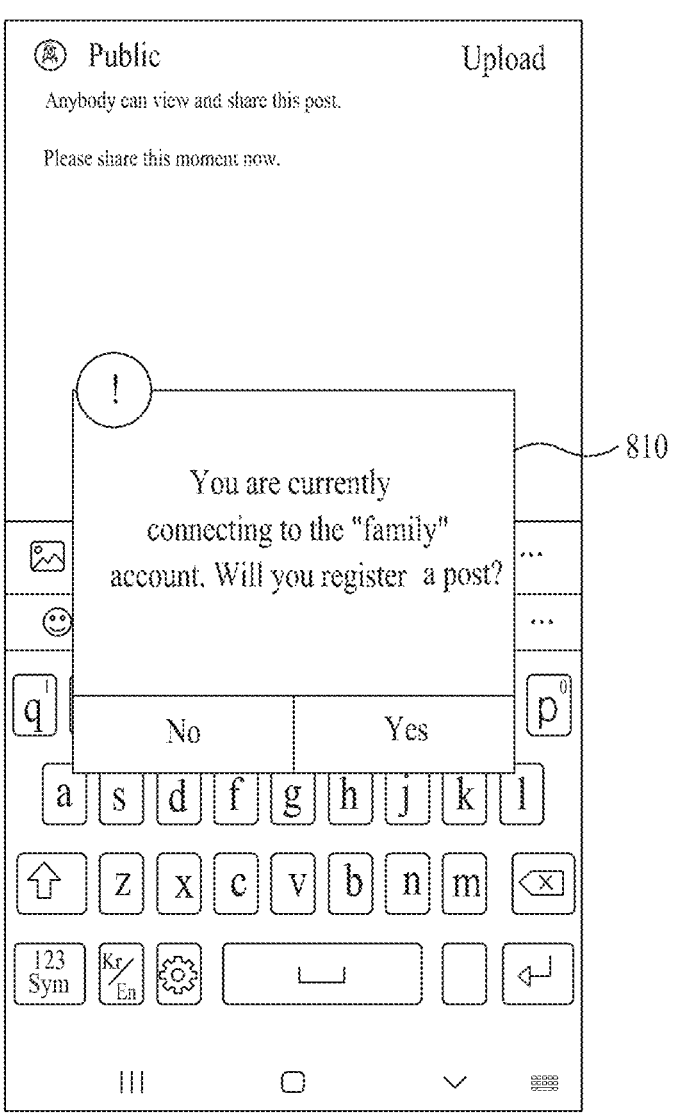

Referring to FIG. 8, when the post written through the post writing screen 700 is determined as content that does not correspond to the use pattern of the "family" account, the processor 220 may display a notification screen 810 including a message indicating an account currently being accessed on the post writing screen 700.

Here, the notification screen 810 may include information about an account currently being accessed.

Therefore, when a user activity different from the corresponding use pattern is detected in the "family" account based on the use pattern of the "family" account, the processor 220 may notify that a current access account is the "family" account through the notification screen 810.

As another example, the processor 220 may determine to a use pattern of which account content of a post written through the post writing screen 700 corresponds between two accounts used by the user, that is, the "family" account and the "friend" account.

Figure 9:
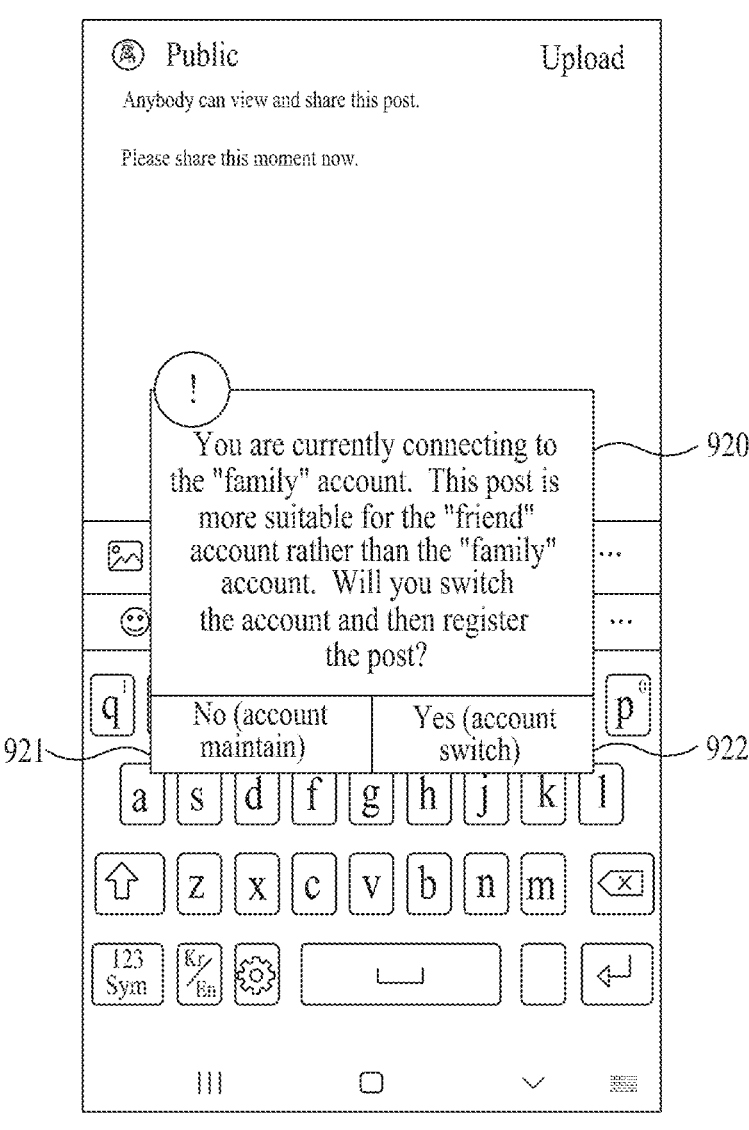

Referring to FIG. 9, when the post written through the post writing screen 700 is determined as content that corresponds to the use pattern of the "friend" account rather than that of the "family" account currently being accessed, the processor 220 may provide a notification screen 920 for verifying whether to switch from the "family" account to the "friend" account and then register the post.

Here, the notification screen 920 may include information about an account currently accessed and information about another account having a use pattern that corresponds to the post written through the post writing screen 700.

Also, the notification screen 920 may further include an "account maintain" interface 921 for maintaining a current access account and an "account switch account 922 for automatically switching to an account of a use pattern that corresponds to the post written through the post writing screen 700.

When the user selects the "account switch" interface 922 on the notification screen 920, the processor 220 may provide a user environment for automatically switching an access account of the user from the "family" account to the "friend" account and then uploading the post written through the post writing screen 700 as content of the "friend" account.

Therefore, when the user activity that corresponds to the use pattern of the "friend" account rather than that of the "family" account is detected based on the use pattern of the "family" account and the use pattern of the "friend" account, the processor 220 may notify that the current access account is the "family" account and, at the same time, provide a path capable of immediately switching to the "friend" account through the notification screen 920.

Although it is described above that a notification is provided based on a use pattern of an account in a process of uploading a post, it is provided as an example only. In addition to a post uploading process, a notification may be provided based on a use pattern of a corresponding account for all activities including a user input, for example, a process of selecting a post disclosure range, a process of inputting a reaction to a post, such as a rating and a comment, a process of sending a message, and a process of selecting a destination of a message.

Also, although not illustrated, the user may maintain the "family" account and register a post without switching from the "family" account to the "friend" account through the notification 920 of the processor 220. Even in this case, the user may change to an appropriate account through an option button in the future.

Further, when the user continues to write a post with an inappropriate account, the processor 220 may provide an account switch path through an additional notification. Even in this case, the user may determine an additional notification status through settings.

Also, when a user activity through a current account does not correspond to use patterns of all accounts of the user, the processor 220 may provide a notification including an interface for opening a new account. That is, when it is determined that a characteristic of a post to be uploaded by the user does not correspond to any of characteristics of the plurality of accounts of the user, the processor 220 may verify whether the user desires to open a new account.

According to some example embodiments, it is possible to provide a notification by determining an account suitable for a user activity based on a use pattern for each account for a user having a plurality of accounts. Further, according to some example embodiments, it is possible to provide an interface allowing/enabling a user to switch from a first account to a second account having a user pattern that corresponds to the user activity among the plurality of accounts.

According to some example embodiments, through content analysis technology using artificial intelligence (AI) and machine learning, a computer system may analyze a pattern of content consumed or uploaded by the user in connection with a first account, and thus may be able to recommend another account, from among a plurality of accounts used by the user, that has a user pattern that corresponds to the user activity of the first account. Processing time and consumption of computing resources may be substantially reduced because there is no need for the user to check each of individual accounts of the user with respect to the user activity of the first account to locate an appropriate alternative user account.

The systems or the apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A content management method performed by a computer device comprising at least one processor configured to execute computer-readable instructions included in a memory, the content management method comprising:

by the at least one processor, creating, based on a first request from a user, a plurality of accounts for the user to enable the user to access to a community service using a respective ID corresponding to each account of the plurality of accounts;

analyzing a use pattern in the community service for the each account for the plurality of accounts used by the user;

in response to a second request for uploading a post to the community service by a first account among the plurality of accounts, determining whether a user activity including the second request in the community service using the first account corresponds to a first use pattern in the community service associated with the first account; and providing a notification for the user activity when the user activity does not correspond to the first use pattern in the community service associated with the first account; and after the post is uploaded to the community service by the first account, re-assigning, in response to a third request from the user through a first interface for account conversion associated with the uploaded post, the post from the first account to a second account, wherein the notification includes a second interface configured to enable conversion of the first account to the second account, among the plurality of accounts, having a second use pattern in the community service associated with the second account that corresponds to the user activity and uploading of the post to the community service by the second account, and wherein the analyzing comprises analyzing a relationship pattern as the use pattern for the each account based on a social graph including the each account related to the user.

2. The content management method of claim 1, wherein the providing comprises providing the notification that includes information about an account among the plurality of accounts currently being used in the community service.

3. The content management method of claim 1, wherein the providing comprises providing the notification that includes information about the second account, among the plurality of accounts among the plurality of accounts, having the second use pattern in the community service associated with the second account that corresponds to the user activity.

4. The content management method of claim 1, wherein the providing comprises providing the notification that includes a third interface for opening a new account of the user when all of use patterns of the plurality of accounts do not correspond to the user activity, and the new account renders the user to access to the community service using an ID corresponding to the new account.

5. The content management method of claim 1, wherein the analyzing comprises analyzing the use pattern further based on content consumed by the user using the each account.

6. The content management method of claim 1, wherein the analyzing comprises analyzing the use pattern further based on content uploaded by the user using the each account.

7. The content management method of claim 1, wherein the analyzing comprises analyzing the use pattern further based on a message sent from the user using the each account.

8. The content management method of claim 1, wherein the determining comprises comparing the user activity to the use pattern of the each account and verifying a specific account, among the plurality of accounts, having a specific use pattern in the community service associated with the specific account that corresponds to the user activity.

9. The content management method of claim 1, wherein the determining comprises determining whether the user activity using the first account corresponds to the first use pattern associated with the first account in the community service based on a tag of content specified as the user activity, a result of analyzing the content specified as the user activity, or a visit destination or a message destination specified as the user activity.

10. A non-transitory computer-readable record medium storing an instruction that, when executed by at least one processor included in a computer device, causes the computer device to perform the content management method of claim 1.

11. The content management method of claim 1, wherein the analyzing the relationship pattern as the use pattern for the each account related to the user comprises analyzing a respective social graph for the each account by analyzing tag information or category information of another account having a relationship established with the each account in the respective social graph.

12. The content management method of claim 1, wherein the notification includes information about the second account among the plurality of accounts when the user activity corresponds to the second use pattern in the community service associated with the second account.

13. A computer device comprising:

at least one processor configured to execute computer-readable instructions included in a memory, wherein the at least one processor is configured to cause the computer device to create, based on a first request from a user, a plurality of accounts for the user to enable the user to access to a community service using a respective ID corresponding to each account of the plurality of accounts, analyze a use pattern in the community service for the each account for the plurality of accounts used by the user, in response to a second request for uploading a post to the community service by a first account among the plurality of accounts, determine whether a user activity including the second request in the community service using the first account corresponds to a first use pattern in the community service associated with the first account, provide a notification for the user activity when the user activity does not correspond to the first use pattern in the community service associated with the first account, and after the post is uploaded to the community service by the first account, re-assign, in response to a third request from the user through a first interface for account conversion associated with the uploaded post, the post from the first account to a second account wherein the notification includes a second interface configured to enable conversion of the first account to the second account, among the plurality of accounts, having a second use pattern in the community service associated with the second account that corresponds to the user activity and uploading of the post to the community service by the second account, and wherein the at least one processor is configured to cause the computer device to analyze a relationship pattern as the use pattern for the each account based on a social graph including the each account related to the user.

14. The computer device of claim 13, wherein the at least one processor is configured to cause the computer device to provide the notification that includes information about an account among the plurality of accounts currently being used in the community service.

15. The computer device of claim 13, wherein the at least one processor is configured to cause the computer device to provide the notification that includes information about the second account, among the plurality of accounts, having the second use pattern in the community service associated with the second account that corresponds to the user activity.

16. The computer device of claim 13, wherein the at least one processor is configured to cause the computer device to analyze the use pattern further based on content consumed by the user using the each account.

17. The computer device of claim 13, wherein the at least one processor is configured to cause the computer device to analyze the use pattern further based on content uploaded by the user using the each account.

18. The computer device of claim 13, wherein the at least one processor is configured to cause the computer device to analyze the use pattern further based on a message sent from the user using the each account.

\* \* \* \* \*